United States Patent [19]

Murai et al.

[11] Patent Number: 4,728,199
[45] Date of Patent: Mar. 1, 1988

[54] TEMPERATURE MEASUREMENT DEVICE

[75] Inventors: Toshio Murai, Iizuka; Junzo Murata; Masahiro Hosono, both of Fukuoka; Isao Imagawa, Nougata, all of Japan

[73] Assignee: Kyushu Hitachi Maxell, Ltd., Fukuoka, Japan

[21] Appl. No.: 815,058

[22] Filed: Dec. 31, 1985

[51] Int. Cl.$^4$ .............................................. G01K 7/00
[52] U.S. Cl. .................................. 371/170; 374/163; 374/186
[58] Field of Search .............. 374/163, 170, 183, 186; 128/736; 364/557

[56] References Cited

U.S. PATENT DOCUMENTS

| | | | |
|---|---|---|---|
| 3,139,753 | 7/1964 | Brudner | 374/183 |
| 3,776,040 | 12/1973 | Gould, III | 374/183 |
| 3,791,214 | 2/1974 | Keith | 374/170 |
| 3,793,630 | 2/1974 | Meijer | 374/171 |
| 4,068,526 | 1/1978 | Goldstein | 374/170 |
| 4,110,746 | 8/1978 | Furukawa | 374/170 |
| 4,176,556 | 12/1979 | Takenaka | 364/557 |
| 4,210,024 | 7/1980 | Ishiwatari et al. | 374/171 |
| 4,418,392 | 11/1983 | Hata | 364/557 |
| 4,447,884 | 5/1984 | Wada | 374/170 |
| 4,536,851 | 8/1985 | Germanton et al. | 374/170 |

FOREIGN PATENT DOCUMENTS 3318540 11/1984 Fed. Rep. of Germany ...... 374/170
2045480 10/1980 United Kingdom ................ 374/183

OTHER PUBLICATIONS

"Omega 1984 Complete Temperature Measurement Handbook-Encyclopedia", Omega Engineering, Inc., Stamford, Conn., Copyright 1983, pp. M-19-M-22.

Primary Examiner—Charles Frankfort
Assistant Examiner—Thomas B. Will
Attorney, Agent, or Firm—Birch, Stewart, Kolasch & Birch

[57] ABSTRACT

In a temperature measurement device, output signals from a temperature measuring sensor having been stored in a recording element are displayed when a judging element detects that a manipulatable switch is closed. Temperature measurement is begun including displaying the temperature when said judging element detects that the switch is opened after it is closed.

5 Claims, 5 Drawing Figures

TEMPERATURE MEASUREMENT DEVICE

BACKGROUND OF THE INVENTION

1. Field of the Invention

The present invention generally relates to a clinical thermometer and a temperature measurement device used for observation and maintenance of machinery, and more particularly to an electronic temperature measurement device equipped with such a function that enables confirmation of the result of the temperature previously measured in advance of measuring the present temperature.

2. Description of the Prior Art

An electronic temperature device of the type referred to above has been widely employed in recent years in various fields of industry, and particularly it has been rapidly replacing a conventional mercury thermometer for domestic use because of its readiness.

However, the electronic temperature measuring device described above is not equipped with such function as its is bestowed on the conventional mercury thermometer that enables, before measurement of the present temperature, confirmation of the result of the previous measurement, and therefore it is inconvenient and troublesome that the value of the previous measurement of the temperature should be written down every time the present temperature is measured.

For solving the above-described disadvantage or inconvenience, a new electronic temperature measuring device has been proposed which is equipped with recording ability such that the result of the measured temperature can be retained even after the power supply is cut off, so as to read out, upon necessity, for display (Published by Electronics Digest Co., Ltd., Dec. 10, 1975, entitled "CMOS IC Handbook", pages 287–293).

However, since the above new electronic temperature measuring device has, in addition to a switch for starting measurement of the temperature a special switch for recording and reading out the result of the previously measured temperature from a memory, the circuit construction therefor becomes complicated, and at the same time, the measuring device itself becomes large in size. What is worse, a user of the measuring device should properly and correctly opeate two switches, which will result in an erroneous operation, and accordingly the above electronic measuring device is not suitable for domestic use mainly at the hands of women and children.

SUMMARY OF THE INVENTION

Accordingly, an essential object of the present invention is to provide an improved temperature measurement device which is provided with one single switch manipulatable from outside of the device such that the result of the previously measured temperature which has been stored in the memory is displayed in accordance with the first manipulation of the switch, and the result of the presently measured temperature is displayed, in place of the result of the previously measured temperature, in accordance with the second manipulation of the switch, thereby realizing the simplification of the circuit construction and the minimization in size of the device, with the easiness for manipulation thereof.

In accomplishing this and other objects, according to the present invention, there is provided an improved temperature measurement device comprising a switch manipulatable from outside of the device, a judgement means for judging or determining that the switch is opened or closed, a temperature measurement means for starting the measurement of the temperature in response to outputs from said judgement means, a recording means for storing output signals of said temperature measurement means and a display means for carrying out the display in accordance with recorded signals within said recording means. In the temperature measurement device having the construction as described above, when it is detected by the judgement means that the switch is in the closed condition, the recorded signals in the recording means are displayed. On the other hand, when it is detected by the judgement means that the switch is opened after being in the closed condition, the measurement of the temperature is started and the value of the measured temperature is displayed. Therefore, it can be selectively conducted in the temperature measurement device of the present invention through manipulation of one single switch that the value of the previously measured temperature is displayed and the measurement of the present temperature is started. Thus, the temperature measurement device of the present invention can be simplified in its construction, compact in size and easy to handle.

BRIEF DESCRIPTION OF THE DRAWINGS

This and other objects and features of the present invention will become apparent from the following description taken in conjunction with one preferred embodiment thereof with reference to the accompanying drawings, in which.

DETAILED DESCRIPTION OF THE EMBODIMENT

Figure 1:
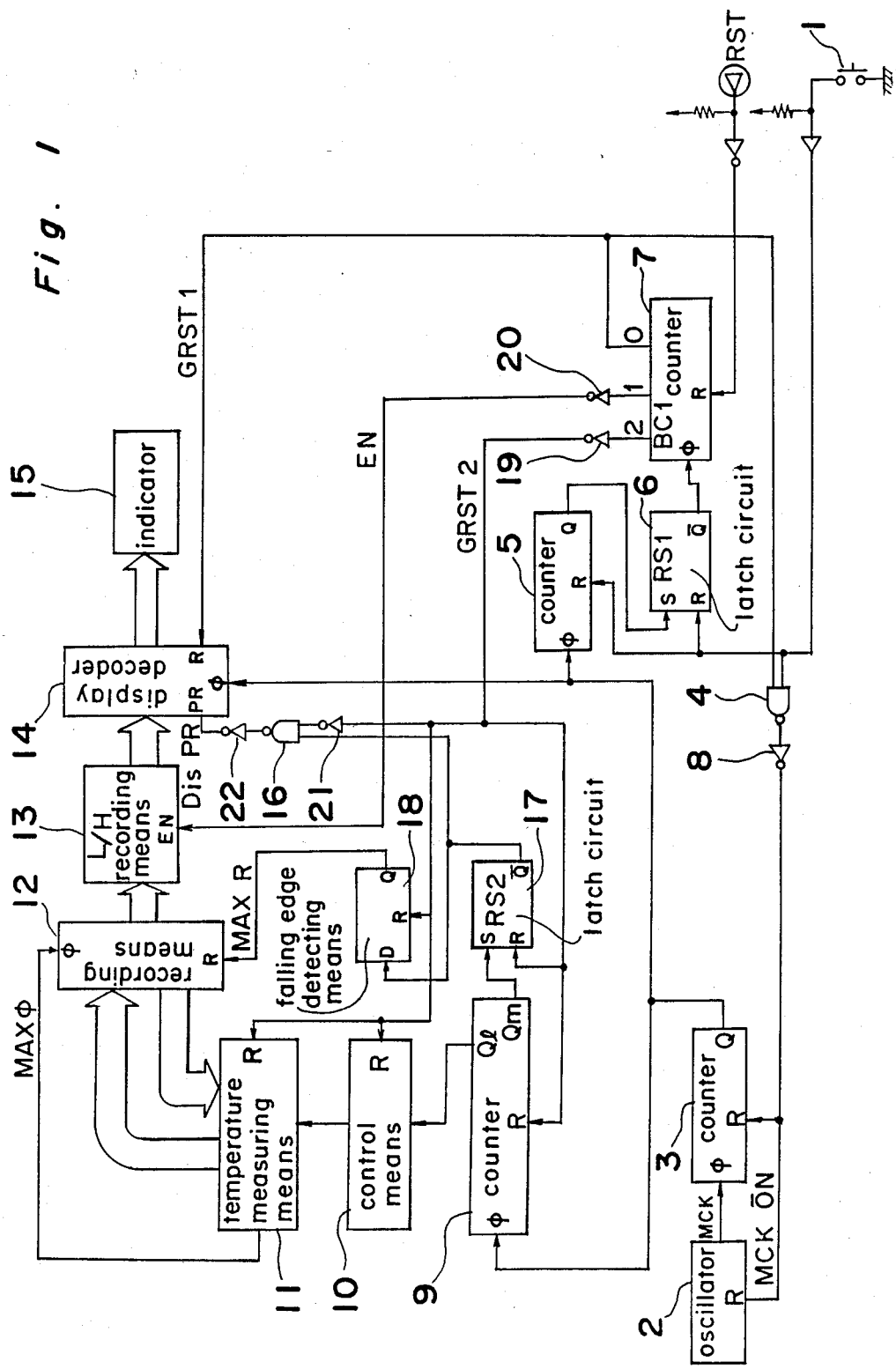
FIG. 1 is a block diagram of a temperature measurement device according to one preferred embodiment of the present invention.

Before the description of the present invention proceeds, it is to be noted that like means are designated by like reference numerals throughout the accompanying drawings.

Referring now to FIG. 1, there is shown a block diagram of a temperature measurement device according to one preferred embodiment of the present invention.

In the same drawing, when a signal supplied to a reset terminal R is at a high level (hereinafter referred to as "H"), each of an oscillator 2, counters 3, 5, 7 and 9, latch circuits 6 and 17 both of RS type, a control means 10, a temperature measuring means 11, a display decoder 24 and a falling edge detecting means 18 is in reset condition.

A switch 1 is a normally-opened type switch which can be manipulated from outside like a push-button switch. When this switch 1 is not manipulated, an input at one side of NAND gate 4 is "H", while the counter 5 and the latch circuit 6 are reset, with their reset inputs being "H".

The oscillator 2, which is a CR oscillator or a crystal oscillator, generates a model clock signal MCK. The model clock signal MCK is frequency-divided into a predetermined frequency by the counter 3, which is then supplied to the counters 5 and 9, and the display decoder 14. Both the oscillator 2 and the counter 3 are respectively switched into an operative condition or an inoperative condition by MCK $\overline{ON}$ signal which is obtained through inversion of output signals from NAND gate 4 by an inverter 8.

The counter 5 and the latch circuit 6 constitute a judgement means so as to judge whether or not the switch 1 is manipulated. In this judgement means, the counter 5 prevents the switch 1 from being erroneously operated due to chattering. In the case that the switch 1 remains closed for over a predetermined time (about 0.1 second), the counter 5 overflows, with its Q output being switched from a low level (hereinafter referred to as "L") to "H". Further, the latch circuit 6 is set by a rising edge of the Q output from the counter 5, when its Q output is switched from "H" to "L". Both the counter 5 and the latch circuit 6 are in the reset condition when the switch 1 is in an opened state, while they are released from the reset when the switch 1 is in a closed state, and accordingly, the $\overline{Q}$ output of the latch circuit 6 is switched from "H" to "L" every time the switch 1 is operated to be in the closed state.

The counter 7 is a 2-bit binary counter, which counts 1 every one falling edge of the $\overline{Q}$ output of the latch circuit 6. Therefore, the number of manipulations of the switch 1 is detected by the counter 7. Further, the counter 7 is provided with output terminals (0), (1) and (2). In the initial stage where the counter 7 is released from the reset, the output terminal (0) is "H", and the output terminals (1) and (2) are "L". Every time the counter 7 counts 1 by the falling edge of the $\overline{Q}$ output from the latch circuit 6, the output terminals (1) and (2) become "H" in this order. Then, when the $\overline{Q}$ output of the latch circuit 6 falls low, the output terminal (0) of the counter 7 becomes "H". Thereafter, the sequence is repeated.

An output signal from the output terminal (0) of the counter 7 (hereinafter referred to as GRST 1) is supplied to the display decoder 14 as a reset signal, and at the same time, also the NAND gate 4. Accordingly, when GRST 1 is "H", the display decoder 14 is reset, while an indicator 15 displays blank (in other words, displays nothing). On the contrary, when GRST 1 is "L", the display decoder 14 is released from the reset so as to make the indicator 15 display given data.

An output signal from the output terminal (1) of the counter 7 is inverted by an inverter 20, which is then supplied, as an EN signal, to an EN terminal of a detecting means 13 in which the temperature outside the range of the measurement is detected. When the EN signal is "H", the range-out detecting means 13 is set in the non-operative condition, while the EN signal is "L", it is set in the operative condition.

On the other hand, an output signal from the output terminal (2) of the counter 7 is inverted by an inverter 19. This output signal is then supplied, as GRST 2 signal, to the counter 9, the control means 10, the temperature measurement means 11, the latch circuit 17, the falling edge detecting means 18 and an inverter 21.

The counter 9 is provided so as to further frequency divide a clock from the counter 3. A Ql output of the counter 9 with a predetermined ratio of frequency division is supplied to the control means 10, thereby to control timing of the measurement of the temperature at the temperature measurement means 11. Although a Qm output is reversed when the counter 9 overflows, the latch circuit 17 is set due to the first rising edge of this Qm output, the $\overline{Q}$ output of which is subsequently switched from "H" to "L". The $\overline{Q}$ output is supplied to the falling edge detecting means 18, forming a MAX R signal representing the falling edge thereof. This MAX R signal resets a recording means 12 composed of D-type flip-flops thereby to erase the data of the previously measured temperature which has been stored until then.

The temperature measuring means 11 conducts periodical measurement of the temperature. The first measurement of the temperature is completed just before the second rising edge of the Ql output from the counter 9. The temperature measured at this time is compared, in synchronization with the rising edge of the Ql output, with the temperature recorded in the recording means 12. Thereafter, one measurement of the temperature is completed every time just before the rising edge of the Ql output of the counter 9, and at every measurement the then measured temperature (hereinafter referred to as presently measured temperature) is compared with the temperature recorded in the recording means 12. When the presently measured temperature is greater than the recorded temperature, the temperature measurement means 11 generates MAX $\phi$ signal such that the presently measured temperature is written in the recording means 12 in place of the temperature stored until that time. Thus, it is so designated that the recording means 12 preserves the largest temperature among the temperatures measured.

The temperature stored in the recording means 12 is read out and supplied to the display decoder 14 through the range-out detecting means 13 so as to be displayed by the indicator 15. However, in the case that the temperature read out from the recording means 12 is out of the predetermined range of the temperature, the range-out detecting means 13 outputs, instead of the measured temperature, data representing a fixed numerical value, mark, pattern or the like to the display decoder 14 in order to indicate the fact that the temperature read out of the recording means 12 is out of the predetermined range of the temperature.

In the present embodiment, the predetermined range of the temperature referred to above is set to be 32.0° C. to 42.0° C. Therefore, when the previously measured temperature stored in the recording means 12 before the recording means is reset by MAX R signal is to be displayed, it is so arranged by the range-out detecting means 13 that the temperature below 32.0° C. is indicated as "32.0° C.", while the temperature over 42.0° C. is indicated as "42.0° C.". Moreover, when the presently measured temperature recorded in the recording means 12 after it is reset by the MAX R signal is to be displayed, it is so arranged by the range-out detecting means 13 that the temperature below 32.0° C. is indicated by the use of symbols or patterns in such as manner as "LO°C.", while the temperature over 42.0° C. is indicated as "HI°C.". In the manner as described hereinabove, the range-out detecting means 13 is controlled by EN signal such that the previously measured temperature is displayed in a different way of display from the presently measured temperature, both temperatures being outside the predetermined range. In other words, the EN signal is set "L" while the previously measured temperature is displayed, and is set "H" while the presently measured temperature is displayed.

After it is released from the rest when the GRST 1 signal becomes "L", the display decoder 14 decodes the data from the range-out detecting means 13, making the indicator 15 display the temperature in the manner as described above. At this time, the display decoder 14 is preset by Dis PR signal in "H" supplied to a preset terminal PR thereof from an inverter 22 which inverts the output of a NAND gate 16, thereby to supply such signals, to the indicator 15, as turning on all the segments of the indicator.

Figure 2:
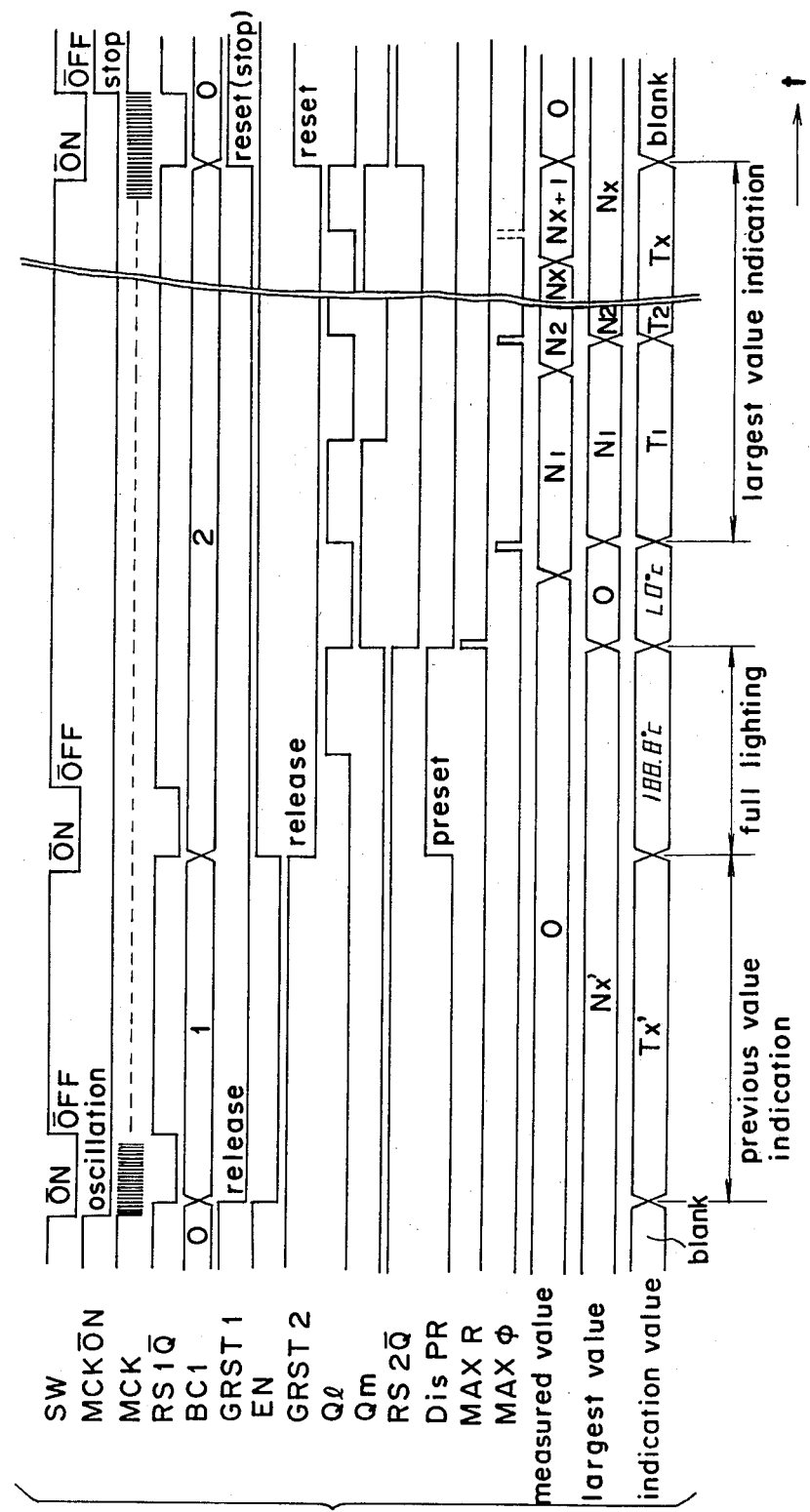
FIG. 2 is a timing chart explanatory of the operation of the temperature measurement device of FIG. 1.

Next, the operation of the temperature measurement device according to the present embodiment will be described hereinbelow with reference to FIG. 2 which shows the operation timing of each means of the device.

The previously measured temperature is stored in the recording means 12 even in the non-operative condition. Upon supply of electric power (not shown), the indicator 15 is brought into the operative condition. Simultaneously with this, the counter 7 is released from the reset. However, since GRST 1 signal from the output terminal (0) of condition, and therefore, the indicator 15 displays blank. Moreover, since the switch 1 is opened, and two inputs of the NAND gate 4 are "H", the output of the NAND gate 4 becomes "L", with the oscillator 2 and the counter 3 being in the reset state. Further, since both the counter 5 and the latch circuit 6 are in the reset state, with the output signal from the output terminal (2) of the counter 7 being "L", and GRST 2 signal being "H", the counter 9, the control means 10, the temperature measurement means 11, the latch circuit 17 and the falling edge detecting means 18 are all in the reset state.

Under the circumstances s described above, when the switch 1 is closed, the counter 5 and the latch circuit 6 are released from the reset, and one of the inputs of NAND gate 4 is inverted from "H" to "L", and therefore, the output of NAND gate 4 becomes "H" and MCK $\overline{ON}$ signal becomes "L", thereby releasing the reset of the oscillator 2 and the counter 3. Subsequently, the oscillator 2 generates a model clock MCK which is in turn frequency-divided by the counter 3.

Although the counter 5 is so designed as to count the clock generated from the counter 3, it overflows if the switch 1 is closed for over approximately 0.1 second, with Q output thereof being inverted from "L" to "H". Due to this inversion of the Q output, the latch circuit 6 is reset, with the $\overline{Q}$ output thereof being inverted from "H" to "L". The counter 7 counts only 1 upon the falling edge of the $\overline{Q}$ output. At this time, GRST 1 signal from the output terminal (0) of the counter 7 is changed from "H" to "L", while the output signal from the output terminal (1) of the counter 7 is changed from "L" to "H", with the EN signal being switched from "H" to "L".

As a result, the display decoder 14 is released from the reset. Then, the value Nx' of the previously measured temperature is read out from the recording means 12, which temperature value Nx' is supplied, through the range-out detecting means 13, to the display decoder 14. In the display decoder 14, the value Nx' is decoded to be displayed as "Tx'°c" by the indicator 14. In this case, when the value Nx' of the previously measured temperature is outside the predetermined range of the temperature referred to earlier, the value is indicated by a fixed value such as "32.0° C." or "42.0° C" described above.

On the other hand, when the switch 1 is opened, the counter 5 and the latch circuit 6 are brought into the reset state again. Since GRST 1 signal is "L", the output of NAND gate 4 is maintained "H", and MCK $\overline{ON}$ signal is "L". Therefore the oscillator 2 and the counter 3 are actuated.

So long as the switch 1 is not closed again, the condition as described above is maintained, and accordingly, the value Nx' continues to be indicated by the indicator 15.

Thereafter, when the switch 1 is closed, the counter 5 and the latch circuit 6 are again released from the reset. In addition, since both of the two outputs of NAND gate 4 are "L", MCK $\overline{ON}$ signal is maintained to be "L" as it is, and the oscillator 2 and the counter 3 are actuated.

At this time, in the case that the switch 1 is closed for over approximately 0.1 second, the counter 5 overflows and the Q output of the latch circuit 6 is inverted from "H" to "L". Accordingly, the counter 7 counts 1. The output signal from the output terminal (1) of the counter 7 is inverted from "H" to "L", and therefore the EN signal is inverted from "L" to "H", while the output signal from the output terminal (2) of the counter 7 is inverted from "L" to "H", with GRST 2 signal also being inverted from "H" to "L".

Then, the counter 9, the control means 10, the temperature measurement means 11, the latch circuit 17 and the falling edge detecting means 18 are all released from the reset. The counter 9 starts to count clocks from the counter 3. Simultaneously, GRST 2 signal in "L" is inverted by the inverter 21 to be supplied to NAND gate 16 which is supplied also with $\overline{Q}$ output in "H" from the latch circuit 17. Therefore, the output of NAND gate 16 shows "L", thereby inverting the Dis PR signal which is an output from the inverter 22 from "L" to "H". As a result, the display decoder 14 is preset by this Dis PR signal, prohibiting receiving of the data from the range-out detecting means 13 and lighting all the segments of the indicator 15.

Thus, by lighting all the segments of the indicator 15, it can be made sure, before starting measurement of the temperature, that the display decoder 14 and the indicator 15 are correctly and normally operated.

It is to be noted that while all the segments are being turned on, the switch 1 is opened because of the completion of the measuring operation, therefore the counter 5 and the latch circuit 6 being reset. Moreover, although the input of NAND gate 4 from the side of the switch 1 is inverted from "L" to "H", GRST 1 signal remains "L", and therefore, MCK $\overline{ON}$ signal also shows "L". The oscillator 2 and the counter 3 still stay in the operative condition.

When the counter 9 keeps counting and the Ql output thereof is inverted from "L" to "H" at a predetermined value of the count, the control means 10 detects the fact, but, without generating signals to the temperature measurement means 11. And, finally when the counter 9 overflows so as to switch the Qm output from "L" to "H", the Ql output is inverted from "H" to "L". In accordance with the change in state of the Qm input, the latch circuit 17 is set, the $\overline{Q}$ output of which is inverted from "H" to "L". The falling edge of this $\overline{Q}$ output, forming MAX R signal thereby resets the recording means 12. Thus, the value Nx' of the previously measured temperature is erased from the recording means 12, and a value 0 is stored therein.

Further, subsequent to the switching of $\overline{Q}$ output of the latch circuit 17 from "H" to "L", the output of NAND gate 16 becomes "H", and accordingly, Dis PR signal becomes "L" so as to release the display decoder 14 from the reset. Consequently, the display decoder 14 is supplied with a temperature value read out of the recording means 12 through the range-out detecting means 13. In this case, however, the value read out of the recording means 12 is 0 outside the predetermined range of the measurement, that is, less than 32.0° C., and therefore, the range-out detecting means 13 supplied the data representing "LO°C." to the display decoder 14, which data is accordingly indicated by the indicator 15.

The counter 9 starts counting again after the overflow. However, when the counted value reaches a predetermined value such that Ql output is switched from "L" to "H", the control means 10 detects the inversion of the Ql output, generating a signal to the temperature measurement means 11.

On the other hand, the temperature measurement means 11 completes the first measurement of the temperature just before Ql output of the counter 9 rises. Therefore, when the temperature measurement means 11 receives a signal from the control means 10, it reads out the measured value from the recording means 12 so as to compare it with the presently measured value N1. In this case, since the measured value read out of the recording means 12 is 0, the presently measured value N1 is larger than the measured value. Therefore, the temperature measurement means 11 sends MAX $\phi$ signal to the recording means 12 such that the presently measured value N1 is written in the recording means 12. Thus, the indicator 15 indicates an indication value "T1°C." with respect to the presently measured value N1.

It is to be noted here that the time interval since the counter 9 starts counting until a predetermined value at which Ql output rises is counted is set to be about 0.7 second in the embodiment. Further, it is also to be noted that the time interval from when the counter 9 overflows until Qm output is inverted is set after about 1.4 seconds.

Therefore, the time interval while "LO°C." described above is indicated is approximately 0.7 second.

In the case that the counter 9 further keeps counting to overflow, Qm output is inverted from "H" to "L", with Ql output being switched from "H" to "L". Then, the counter 9 starts counting again. After the lapse of about 0.7 second, Ql output is charged from "L" to "H". In consequence of this, the presently measured value N2 obtained immediately before the inversion of Ql output from "L" to "H" is compared with the previously measured value N1 stored in the recording means 12, in the temperature measurement means 11. When the value N2 is larger than the value N1, the value N1 is replaced with the value N2 in the recording means 12. Therefore, the indicator 15 indicates "T2°C." with respect to the value N2.

Thus, in the manner as described above, so long as the switch 1 is not operated, a presently measured value is compared with the value recorded in the recording means 12 at the rising time of $\overline{Q}$ output every time the counter 9 repeats the counting. If the presently measured value is larger than the recorded value, the former replaces the latter in the recording means 12. Therefore, the indicator 15 indicates the largest temperature ever measured. As the measured temperature rises, the value indicated by the indicator 15 is renewed.

In this csae, although Qm output is reversed each time the counter 9 overflows, the latch circuit 17 is retained in the set state.

Next, upon closure of the switch 1, the counter 3 and the latch circuit 6 are released from the reset. In this case also, since MCK $\overline{ON}$ signal is maintained to be "L", the oscillator 2 and the counter 3 are in the operative condition. Then, the counter 5 overflows approximately 0.1 second later, the latch circuit 6 is set, $\overline{Q}$ output of which is switched from "H" to "L". Accordingly, the counter 7 counts 1. As a result, GRST 1 signal from the output terminal (0) is switched from "L" to "H", and the display decoder 14 is reset, while the indicator decoder 4 displays blank.

Simultaneously, the output signal from the output terminal (2) of the counter 7 is switched from "H" to "L", and GRST 2 signal is switch from "L" to "H". Thus, the counter 9, the control means 10, the temperature mesurement means 11, the latch circuit 17 and the falling edge detecting means 18 are put in the reset state. In this case, since MAX R signal is not generated, the largest value Nx recorded until then in the recording means 12 is still retained. The largest measured value Nx becomes a previously measured value at the next time of the temperature measurement.

When the switch 1 is opened after the completion of the operation, the counter 5 and the latch circuit 6 are reset. At the same time, two inputs of NAND gate 4 are both reversed to "H", thereby also switching the MCK ON signal "H". Therefore, the oscillator 2 and the counter 3 are reset to be in the non-operative condition. Thus, the temperature measuring operation is completed, stopping the system.

As is clear from the foregoing description, according to the present embodiment, the previously measured temperature and the largest of the presently measured temperature are alternately displayed when the single switch 1 is manipulated. Therefore, the operation for measuring the temperature becomes remarkably simplified. Moreover, since the previously measured temperature is indicated so long as the switch 1 is not manipulated after the display, it is advantageous, for example, that sufficient time can be obtained necessary for recording the previously measured temperature for the purpose of comparison thereof with the presently measured temperature.

Furthermore, it is so arranged that, when the measured temperature is outside the predetermined range of the measurement, the previously measured temperature and the presently measured temperature are indicated by different numerical values, symbols or patterns from each other. Therefore, it is convenient that the previously measured temperature can be clearly distinguished from the presently measured temperature.

Moreover, before the temperature measurement is started, the recording means 12 is reset such that the recorded contents becomes 0. Accordingly, the indicator 15 indicates "LO°C.", from which it can be confirmed that the temperature measurement is started.

In addition, it is also convenient that, before the temperature measurement is started, it can be confirmed by turning on all the segments of the indicator 15 that the display decoder 14 and the indicator 15 are properly operated.

It is to be noted that although numerical values are indicated concretely for description of the present embodiment, it is only by way of example, and therefore, the present invention is not restricted by those numerical values.

So long as it can be opened and closed from outside of the device housing, the switch 1 may be of any type such as a push-button type or a slide type, or such one that is provided with a lead switch within the housing (not shown) so as to be operated by a magnet or the like from outside.

As is described above, according to the present invention, the previously measured temperature can be easily replaced with the presently measured temperature, or the temperature measurement can be promptly started or stopped through manipulation of only one single switch. Moreover, the time period for display of the previously measured temperature can be set as desired by not manipulating the switch. Therefore, the temperature measurement device of the present invention is remarkably simplified and easy in manipulation thereof. Furthermore, it is advantageous that the temperature measurement device of the present invention is simple in construction and compact in size.

Figure 3:
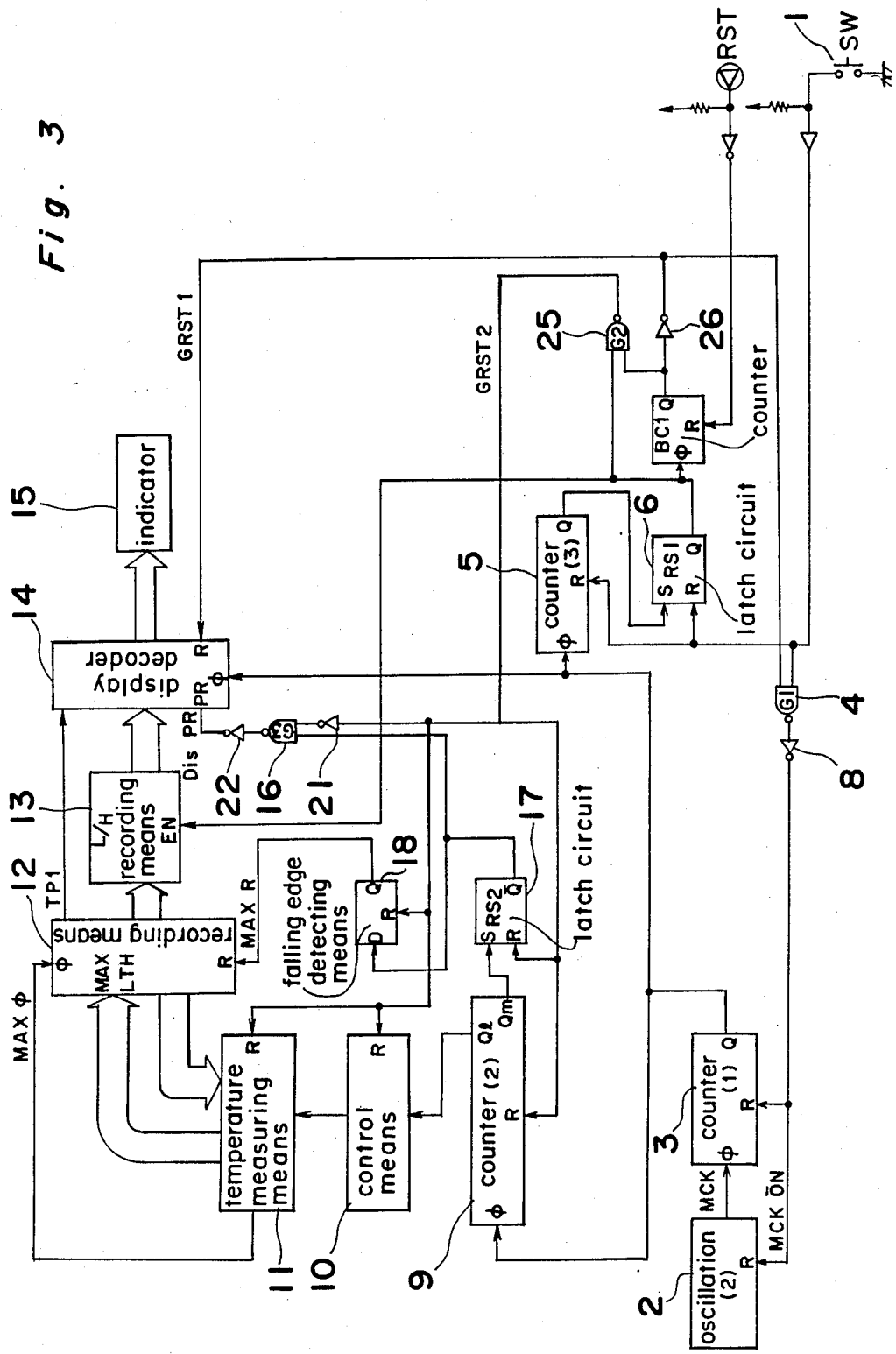
FIG. 3 is a block diagram of a temperature measurement device according to another embodiment of the present invention.
Figure 4:
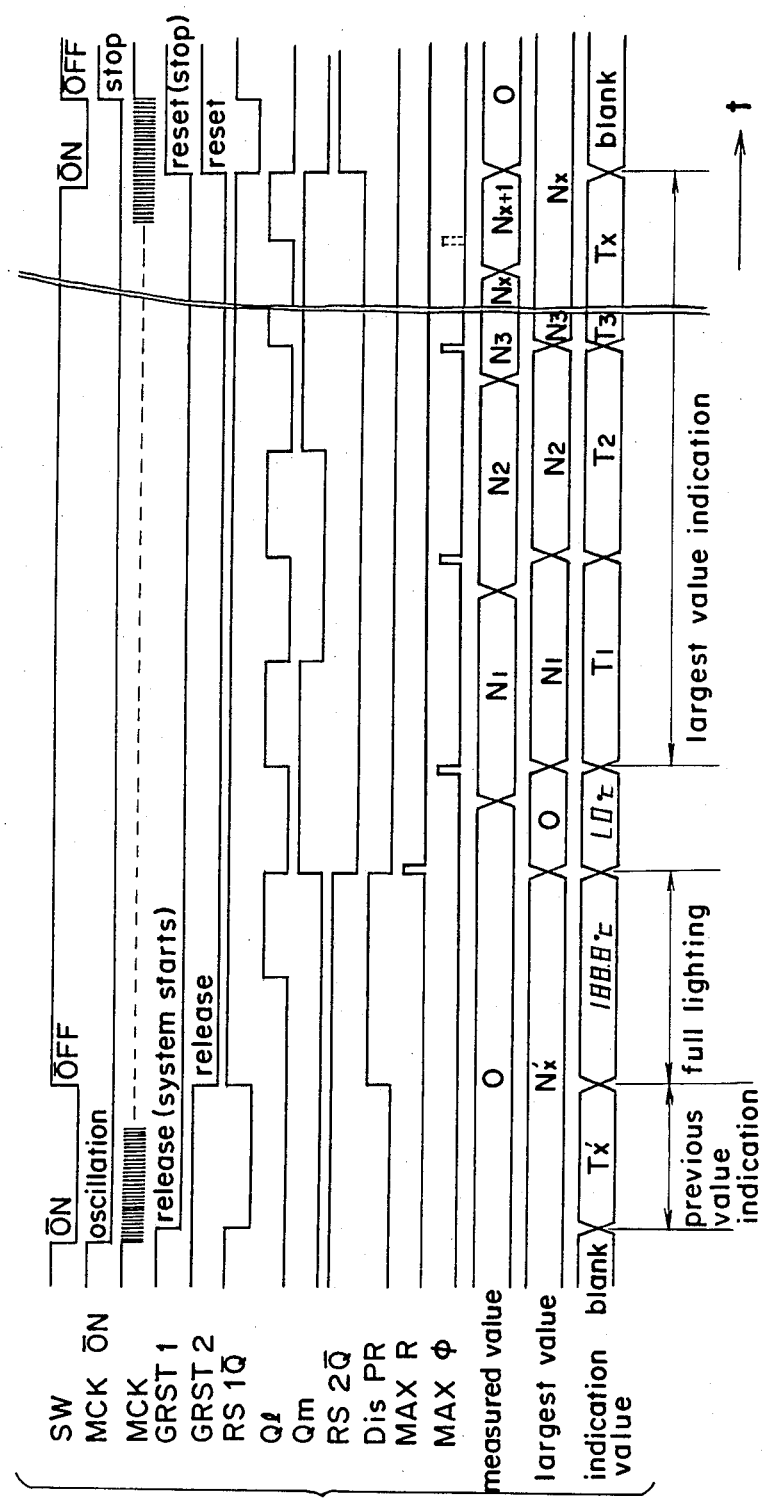
FIG. 4 is a timing chart explanatory of the operation of the temperature measurement device of FIG. 3.
Figure 5:
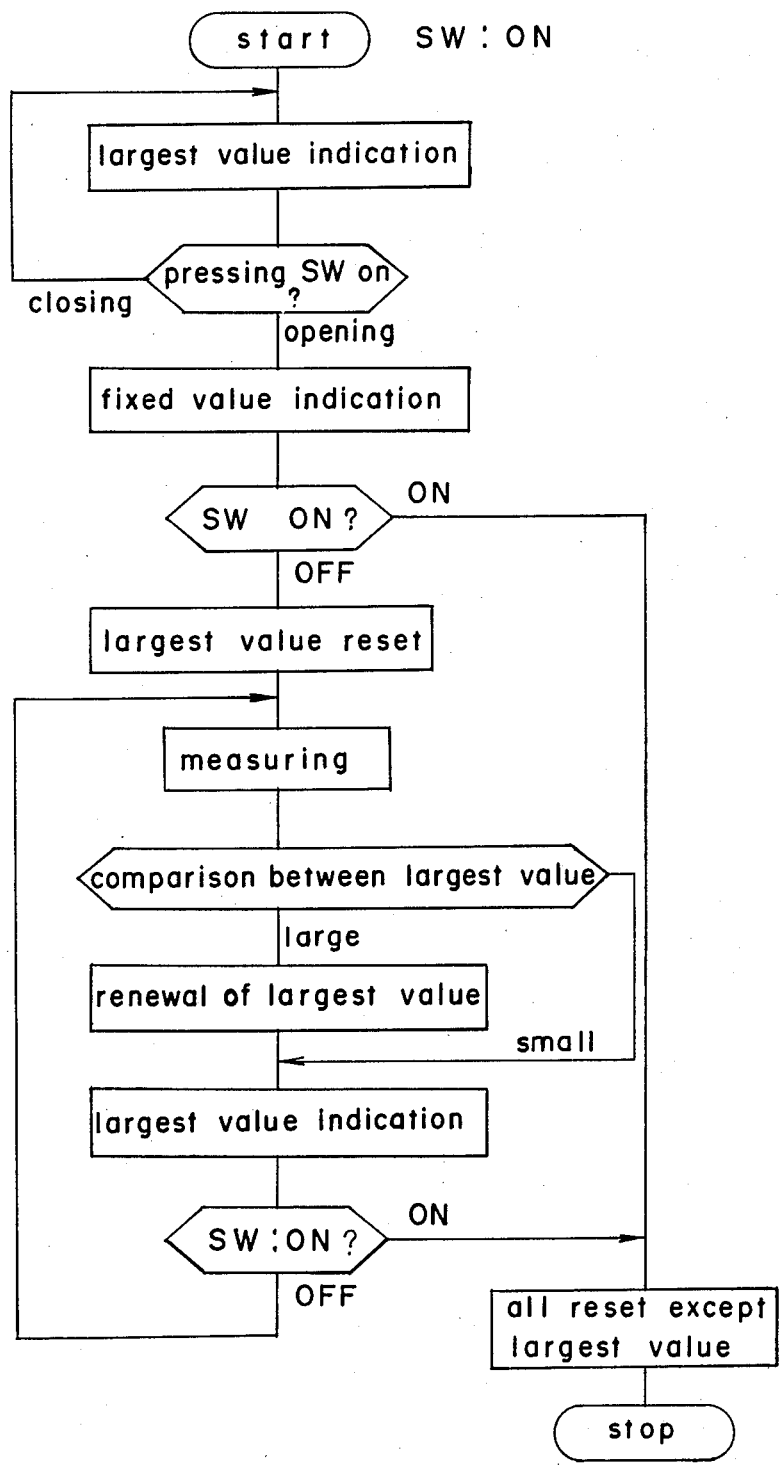
FIG. 5 is a flow chart explanatory of the operation of the temperature measurement device of FIG. 3.

Although the present invention has been fully described by way of example with reference to the accompanying drawings, it is to be noted here that various changes and modifications will be apparent to those skilled in the art. For example, the counter 7 may be constructed as a 1-bit counter, as shown in FIG. 3, which receives the $\overline{Q}$ output from the RS latch circuit (RS1) as clock signals to drive the whole system of device in case of the $\overline{Q}$ output being "H" or to stop the device in case of the $\overline{Q}$ output being "L". And, a NAND gate 25 is provided between the Q output of the counter 7 and the inverter 21 and the D terminal of the falling edge detecting means 18 in place of the inverter 19 of the first embodiment, which outputs a reset signal (GRST2) in the case of either the whole system being stopped or the switch 1 (SW) being closed. Also, an inverter 26 is provided between the $\overline{Q}$ output of the counter 7 and the R terminal of the display decoder 14, while the inverter 20 of the first embodiment is deleted by providing a connection of line between the $\overline{Q}$ terminal of the latch circuit 6 and the EN terminal of the detecting means. In the embodiment of FIG. 3, the operation of the device is almost the same as that of the first embodiment in accordance with a timing chart and a flow chart of FIGS. 4 and 5. In FIGS. 4 and 5, in the stop condition of the whole system, the indicator 15 is indicating a blank indication while the other components except MAX LTH 12 are in the state of reset. When the SW1 is ON, the MCK ON signal becomes "L" to release the reset of the OSC(2) 2 and counter (1) 3 and to output the MCK to divide in frequency, and, at the same time, the resets of the counter (3) 5 and the RS16 are also released. If the SW1 is pressed on for more than about 0.1 second, the counter (3) is overflow to turn the RS1 in set, and the $\overline{Q}$ output of RS1 becomes "L". Upon receiving the "L" signal, the Q output of BC1 7 inverts to "H" with releasing the reest of display decoder 14 to begin the indication. But, at this time, the counter (2) 2, control means 10 and temperature measuring means are kept in the reset states not to start the measuring of temperature, and the data of MAX LTH 12 indicates the previously measured value having been held up to this time. Then, when the SW1 is turned to OFF, the counter (3) 5 and RS1 6 are reest to turn the $\overline{Q}$ output of RS1 6 into "H". Also, the GRST2 becomes "L" to release the reest of the remaining components of the device and the whole system is brought into drive. The Q output of RS2 is kept in "H" until the Qm output of counter (2) 2 is initially raising up, the output of G3 16 becomes "L" to drive the Dis PR and the whole lifting is indicated. The Qm output of counter (2) 2 is initially raised up for about 1.4 seconds after the SW10 is turned to OFF, and the RS2 17 is set to generate the $\overline{Q}$ output in "L" with releasing the Dis PR to indicate the whole lighting. At this time, upon the detection of coming down of the $\overline{Q}$ output, the MAX R is generated to reset the LTH12 initially. The other operation of this embodiment is similar to that of the first embodiment and this embodiment is also to provide a device for driving the whole system by the operation of one switch in a small compact construction. Therefore, unless otherwise such changes and modifications depart from the scope of the present invention, they should be construed as being included therein.

What is claimed is:

1. A temperature measurement device comprising:
   a single operator actuatable switch manipulatable from outside the device, said switch having open and closed states;
   temperature measurement means for measuring a temperature of interest and developing a temperature signal representative thereof;
   judging means, monitoring said operator actuable switch, for detecting whether said dswitch is in said open state or in said closed state;
   recording means for storing sid temperature signal developed by said temperature measurement means; and
   display means for displaying a temperature represented by a temperature signal provided thereto;
   said judging means, upon detecting said switch is in said closed state, recalling the temperature signal representative of a previous temperature stored in said recording means and supplying said temperature signal to said display means for display thereon, said judging means, upon detecting an open state of said switch subsequent to said closed state, supplying the temperature signal developed by said temperature measurement means and representative of a current measured temperature to said display means for display thereon;
   said previous temperature being displayed on said display means for as long as said switch is held in said closed state.

2. A temperature measurement device as claimed in claim 1, further comprising detecting means provided between said recording means and said display means, for monitoring said temperature signal recalled from said recording means by said judging means fand for detecting whether said temperature signal stored in said recording means is representative of a previously stored temperature outside a predetermined range of the temperatures, said detecting means developing a detected signal for supply to said display means to be displayed thereby while said judging means detects that the switch is in the closed state.

3. A temperature measurement device as claimed in claim 1, further comprising a counter, enabled by the detection by said judging means of an open switch state subsequent to a closed switch state, for counting a predetermined time period and developing a counter output;

said display means including a digital display including a plurality of segments and means for driving said display;

said means for driving being responsive to said counter output to drive all said segments of said display means during said predetermined time period from when a previously measured temperature is indicated until a presently measured temperature is started to be displayed.

4. A temperature measurement device as claimed in claim 3, wherein said judge means, responsive to said counter output, resets said recording means signal from said detecting means upon completion of said predetermined time period, and at the same time, the display of the temperature outside the predetermined range is developed by said display means until output signals within said range to be supplied to the recording means from the temperature measuring means are generated.

5. The device of claim 3, wherein a subsequent actuation of said switch to said closed state will enable said judging means to store said temperature signal representative of a present temperature in said recording means as a new previous temperature.

* * * * *